(12) United States Patent
Matsuyama et al.

(10) Patent No.: US 10,518,374 B2
(45) Date of Patent: Dec. 31, 2019

(54) CHIP CONVEYOR AND MACHINE TOOL

(71) Applicant: DMG MORI CO., LTD., Yamatokoriyama-shi (JP)

(72) Inventors: Tomoyoshi Matsuyama, Yamatokoriyama (JP); Yuhei Kitade, Yamatokoriyama (JP); Tatsuya Aizawa, Yamatokoriyama (JP); Futoshi Yamazaki, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 99 days.

(21) Appl. No.: 15/934,110

(22) Filed: Mar. 23, 2018

(65) Prior Publication Data

US 2018/0272488 A1  Sep. 27, 2018

(30) Foreign Application Priority Data

Mar. 24, 2017  (JP) .................................. 2017-058784

(51) Int. Cl.
*B23Q 11/10* (2006.01)
*B23Q 11/08* (2006.01)
(Continued)

(52) U.S. Cl.
CPC .......... *B23Q 11/0075* (2013.01); *B01D 29/03* (2013.01); *B01D 29/56* (2013.01);
(Continued)

(58) Field of Classification Search
CPC ... Y10S 29/075; Y10S 29/05; B23Q 11/0057; B23Q 11/0075; Y02P 70/171;
(Continued)

(56) References Cited

U.S. PATENT DOCUMENTS 4,394,272 A * 7/1983 Damerau ........... B01D 21/0012
                                                          210/779
5,992,642 A * 11/1999 Ota ....................... B01D 33/04
                                                          210/396
(Continued)

FOREIGN PATENT DOCUMENTS

CN       204737305 U  * 11/2015
CN       106271857 A  *  1/2017
(Continued)

OTHER PUBLICATIONS

Machine Translation CN 106271857 A, which CN '857 was published Jan. 2017.*

(Continued)

*Primary Examiner* — Erica E Cadugan
(74) *Attorney, Agent, or Firm* — Oblon, McClelland, Maier & Neustadt, L.L.P.

(57) ABSTRACT

A chip conveyor includes: a cover body; a guide plate configured to guide chips, which are conveyed inside the cover body, so as to be directed from a chip receiving position toward a chip discharging position; a case attached to the cover body and having an internal space provided therein; and a float switch configured to detect, based on a coolant flowing from inside the cover body into the internal space, that a liquid level of the coolant inside the cover body is equal to or greater than a prescribed liquid level. The cover body includes a first space and a second space that are partitioned from each other by the guide plate. The cover body is provided with: a first opening allowing communication between the first space and the internal space; and a second opening allowing communication between the second space and the internal space.

6 Claims, 7 Drawing Sheets

(51) Int. Cl.
  *B23Q 11/00*  (2006.01)
  *B23Q 17/00*  (2006.01)
  *B65G 19/10*  (2006.01)
  *B01D 29/88*  (2006.01)
  *B65G 19/22*  (2006.01)
  *B01D 33/073* (2006.01)
  *B01D 33/41*  (2006.01)
  *B01D 33/50*  (2006.01)
  *B01D 29/03*  (2006.01)
  *B01D 29/56*  (2006.01)
  *B01D 29/64*  (2006.01)
  *B23B 11/00*  (2006.01)
  *G01F 23/00*  (2006.01)
  *B23B 3/06*   (2006.01)

(52) U.S. Cl.
  CPC ....... *B01D 29/6484* (2013.01); *B01D 29/885* (2013.01); *B01D 33/073* (2013.01); *B01D 33/41* (2013.01); *B01D 33/50* (2013.01); *B23Q 11/0057* (2013.01); *B23Q 11/0085* (2013.01); *B23Q 11/10* (2013.01); *B23Q 17/007* (2013.01); *B65G 19/10* (2013.01); *B65G 19/22* (2013.01); *B01D 2201/48* (2013.01); *B23B 3/065* (2013.01); *B23Q 11/0891* (2013.01); *B23Q 11/1069* (2013.01); *G01F 23/00* (2013.01); *Y10S 29/05* (2013.01); *Y10S 29/077* (2013.01); *Y10T 29/5114* (2015.01); *Y10T 409/30392* (2015.01); *Y10T 409/304032* (2015.01); *Y10T 409/304088* (2015.01)

(58) Field of Classification Search
  CPC .... Y10T 409/304088; Y10T 29/50–52; B01D 2201/48; B65G 19/10
  USPC ........ 409/137; 73/290 R–290 V; 29/DIG. 75, 29/DIG. 50, 560–650; 198/728–733
  See application file for complete search history.

(56) References Cited

U.S. PATENT DOCUMENTS

| | | | | |
|---|---|---|---|---|
| 6,066,255 | A * | 5/2000 | Anderson | B01D 33/04 210/297 |
| 6,332,983 | B1 * | 12/2001 | Tashiro | B23Q 11/0057 210/295 |
| 6,601,691 | B1 * | 8/2003 | Enomoto | B23Q 11/0057 198/495 |
| 7,115,200 | B2 * | 10/2006 | Ackermanns | B01D 33/073 210/297 |
| 7,410,569 | B1 * | 8/2008 | Tilev | B01D 21/0012 210/167.02 |
| 8,029,670 | B2 * | 10/2011 | Dietenhauser | B01D 29/01 210/236 |
| 9,339,907 | B2 * | 5/2016 | Matsuyama | B23Q 11/0057 |
| 9,382,071 | B2 * | 7/2016 | Matsuyama | B65G 19/10 |
| 9,415,475 | B2 * | 8/2016 | Tak | B23Q 11/0057 |
| 9,694,459 | B2 * | 7/2017 | Kakutani | B23Q 11/0067 |
| 2004/0047700 | A1 * | 3/2004 | Maeda | B23Q 11/0891 409/134 |
| 2007/0181492 | A1 * | 8/2007 | Uchiyama | B01D 33/073 210/312 |
| 2010/0320158 | A1 * | 12/2010 | Mahas | B23Q 11/0057 210/776 |
| 2012/0079928 | A1 * | 4/2012 | Hoshi | B23Q 11/0057 83/78 |
| 2014/0054244 | A1 * | 2/2014 | Towers | B01D 33/333 210/767 |
| 2014/0124418 | A1 * | 5/2014 | Ishihara | B23Q 11/1069 210/86 |
| 2017/0144262 | A1 * | 5/2017 | Okuda | B08B 9/00 |
| 2018/0280841 | A1 * | 10/2018 | Tashiro | B01D 33/41 |
| 2018/0296950 | A1 * | 10/2018 | Yang | B01D 33/0058 |

FOREIGN PATENT DOCUMENTS

| | | | |
|---|---|---|---|
| DE | 10209914 A1 | * | 9/2003 |
| DE | 102011118404 A1 | * | 5/2013 |
| DE | 102011118405 A1 | * | 5/2013 |
| EP | 96009 A2 | * | 12/1983 |
| JP | 62-271652 A | * | 11/1987 |
| JP | 04-183553 A | * | 6/1992 |
| JP | 2002-143612 | | 5/2002 |
| JP | 2014-097544 A | * | 5/2014 |
| JP | 3200999 U | | 11/2015 |
| WO | WO-03/031116 A2 | * | 4/2003 |
| WO | WO-03-064106 A1 | * | 8/2003 |

OTHER PUBLICATIONS

Machine Translation WO 03/064106 A1, which WO '106 was published Aug. 2003.*

* cited by examiner

CHIP CONVEYOR AND MACHINE TOOL

BACKGROUND OF THE INVENTION

Field of the Invention

The present invention relates to a chip conveyor and a machine tool.

Description of the Background Art

Regarding conventional chip conveyors, for example, Japanese Utility Model Registration No. 3200999 discloses a chip discharging apparatus equipped with a detection device, which is capable of dealing with anomalous situations in advance.

The chip discharging apparatus disclosed in Japanese Utility Model Registration No. 3200999 includes a case. The case is provided with: a housing groove in which a transport belt and a drum filtering net are arranged; and an attachment hole penetrating through the case. The chip discharging apparatus further includes a detection device having a communicating tube connected to the housing groove through the attachment hole. As the cutting oil in the housing groove is guided through the communicating tube by the Pascal's law, the detection device detects the liquid level height of the cutting oil in the housing groove.

Furthermore, Japanese Patent Laying-Open No. 2002-143612 discloses a coolant liquid purifying apparatus aiming to: significantly save the power consumption of a drive motor in a chip conveyor, and suppress wear of each component and damage caused on a conveyor by an overload to thereby lengthen the life of the conveyor; and prevent an overflow caused by clogging of a filter drum to thereby improve the filtering accuracy.

The coolant liquid purifying apparatus disclosed in Japanese Patent Laying-Open No. 2002-143612 includes: a power consumption detection unit for detecting a drive load in a drive motor of a chip conveyor as its power consumption; a liquid level detection unit for detecting the degree of clogging of a filter drum in a filtering mechanism by the liquid level in a dirty coolant bath; and a motor drive control unit for controlling the speed of the drive motor when a power detection signal from the power consumption detection unit is equal to or greater than a drive load setting reference value, and controlling the drive motor to be stopped or started by a level signal from the liquid level detection unit when the power detection signal is equal to or less than the drive load setting reference value.

SUMMARY OF THE INVENTION

There is a known chip conveyor configured to receive, in its cover body, chips of a workpiece and a coolant discharged from a machine tool body, and convey the chips inside the cover body. In the above-described Japanese Utility Model Registration No. 3200999, such a chip conveyor is provided with a detection device for detecting the liquid level of the coolant inside the cover body.

In addition, there is one type of chip conveyor that includes a guide plate for guiding the chips, which are conveyed inside the cover body, from a chip receiving position toward a chip discharging position. According to the above-described type of chip conveyor, it is considered that the space inside the cover body is partitioned by the guide plate, thereby causing a difference in coolant liquid level between the partitioned spaces. In this case, the coolant liquid level inside the cover body cannot be appropriately detected, so that there is a possibility that the coolant may overflow.

Thus, the present invention aims to solve the above-described problems, and to provide a chip conveyor configured to more reliably prevent an overflow of a coolant, and a machine tool including the chip conveyor.

A chip conveyor according to the present invention includes: a cover body configured to receive chips and a coolant; a guide plate configured to guide the chips, which are conveyed inside the cover body, so as to be directed from a chip receiving position toward a chip discharging position; a housing attached to the cover body and having an internal space provided therein; and a liquid level detection unit configured to detect, based on the coolant flowing from inside the cover body into the internal space, that a liquid level of the coolant inside the cover body is equal to or greater than a prescribed liquid level. The cover body includes a first space and a second space that are partitioned from each other by the guide plate. The cover body is provided with: a first opening allowing communication between the first space and the internal space; and a second opening allowing communication between the second space and the internal space.

A machine tool according to the present invention includes: a machine tool body configured to machine a workpiece; and the above-described chip conveyor configured to receive chips and a coolant that are discharged from the machine tool body.

According to the present invention, it becomes possible to provide: a chip conveyor configured to more reliably prevent an overflow of a coolant; and a machine tool including the chip conveyor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described in detail with reference to the accompanying drawings, in which the same or corresponding components are designated by the same reference characters.

First Embodiment

Figure 1:
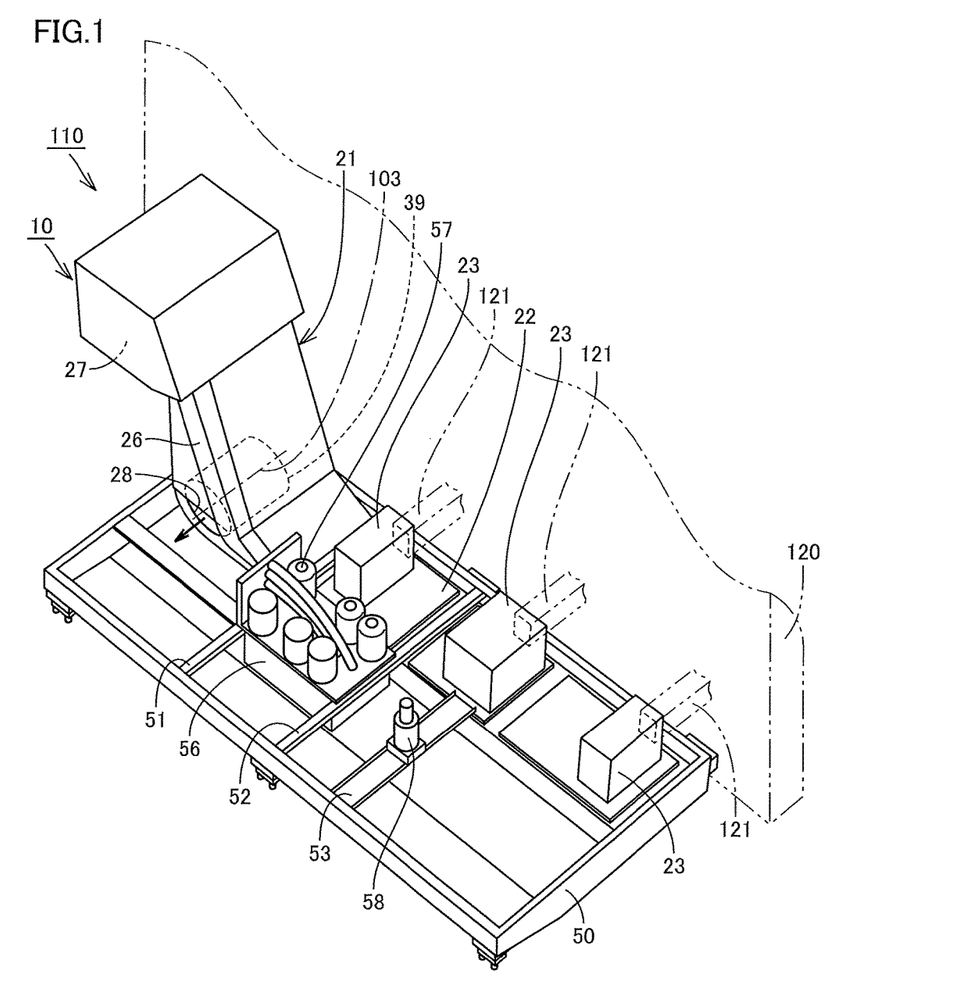
FIG. 1 is a perspective view showing a machine tool including a chip conveyor in the first embodiment of the present invention.

FIG. 1 is a perspective view showing a machine tool including a chip conveyor in the first embodiment of the present invention. Referring to FIG. 1, a machine tool 110 includes a machine tool body 120, a chip conveyor 10, and a coolant tank 50.

Machine tool 110 is, for example, a machining center, a lathe, a multi-functional manufacturing machine having both a turning function and a milling function, and the like. Machine tool body 120 serves as a main body included in machine tool 110 and machining a workpiece.

Chip conveyor 10 and coolant tank 50 are arranged side by side in machine tool body 120. Coolant tank 50 is configured to be capable of storing a coolant. Chip conveyor 10 is housed in coolant tank 50.

Chip conveyor 10 receives chips and a coolant discharged from machine tool body 120. Chip conveyor 10 conveys the chips toward a chip bucket (not shown), and filters the coolant to discharge a clean coolant to coolant tank 50.

Coolant tank 50 is equipped with a plurality of pumps 57, a pump installation stand 56, and an oil skimmer 58.

Pump 57 supplies the coolant stored in coolant tank 50 toward machine tool body 120. The plurality of pumps 57 are provided according to the intended use of the coolant in machine tool body 120 (a spindle coolant, a through-spindle coolant, a shower coolant, a base coolant, and the like). Oil skimmer 58 is provided as a device for collecting the floated oil inside coolant tank 50.

Pump installation stand 56 is mounted so as to be attachable to and detachable from coolant tank 50. Using means such as a bolt, pump installation stand 56 is attached to a stay 51 and a stay 52 that are bridged over the opening plane of coolant tank 50. The plurality of pumps 57 are attached to pump installation stand 56. Oil skimmer 58 is attached to a stay 53 that is bridged over the opening plane of coolant tank 50.

Figure 2:
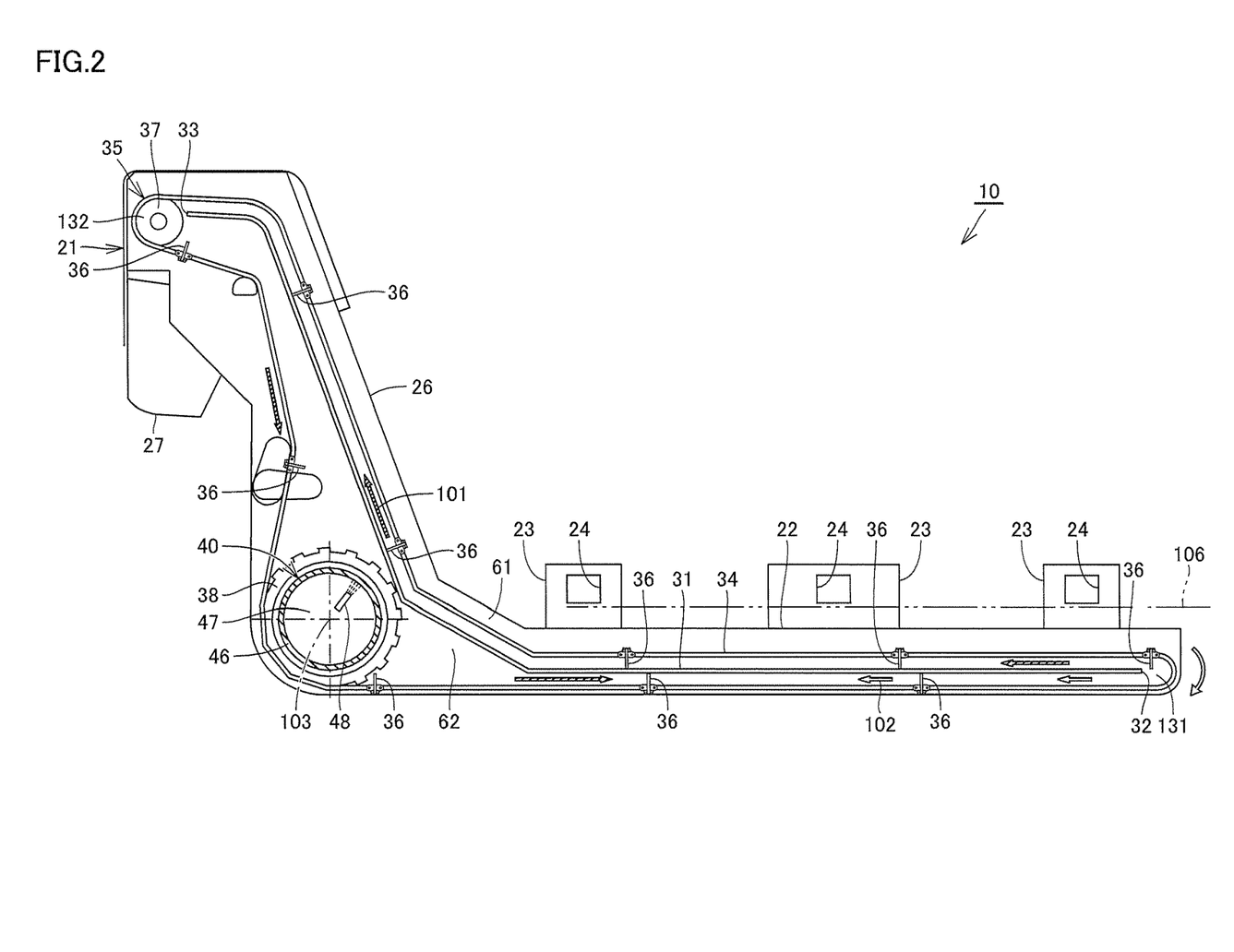
FIG. 2 is a cross-sectional view showing the chip conveyor in FIG. 1.

FIG. 2 is a cross-sectional view showing the chip conveyor in FIG. 1. Referring to FIGS. 1 and 2, chip conveyor 10 has a cover body 21. Cover body 21 forms an external appearance of chip conveyor 10. Cover body 21 is formed in a housing shape having a space formed therein.

Cover body 21 is formed of components including: a horizontal portion 22; a standing portion 26; a chip receiving unit 23; and a chip discharging unit 27.

As a whole, cover body 21 is shaped to be curved between horizontal portion 22 and standing portion 26. Horizontal portion 22 is placed inside coolant tank 50. Horizontal portion 22 has an external appearance formed in a plate shape extending in the horizontal direction. Horizontal portion 22 has a rectangular shape as seen in plan view. Standing portion 26 is configured to rise from one end of horizontal portion 22 in the longitudinal direction and extend obliquely upward.

Chip receiving unit 23 is provided in horizontal portion 22. Chip receiving unit 23 is formed of a housing provided on the top surface of horizontal portion 22. In the present embodiment, a plurality of chip receiving units 23 are provided spaced apart from each other in the longitudinal direction of horizontal portion 22. Chip receiving unit 23 is provided with a connection port 24. Connection port 24 is formed of a through hole that penetrates through chip receiving unit 23. To chip receiving unit 23, a chip conveyance device 121 is connected through connection port 24. Chip conveyance device 121 serves as equipment provided on the side of machine tool body 120. Chip conveyance device 121 is configured, for example, to include a trough part extending in one direction and a spiral conveyor placed in the trough part.

Chip discharging unit 27 is provided at the distal end of standing portion 26 extending obliquely upward from horizontal portion 22. Chip discharging unit 27 is formed to include an opening of cover body 21 that is opened vertically downward. Below chip discharging unit 27, a chip bucket (not shown) for collecting chips is provided. The chips of the workpiece discharged from machine tool body 120 are received through chip receiving unit 23 into cover body 21. The chips are conveyed inside cover body 21 by the chip conveyance mechanism (which will be described later), discharged from chip discharging unit 27, and then collected in the chip bucket.

Figure 5:
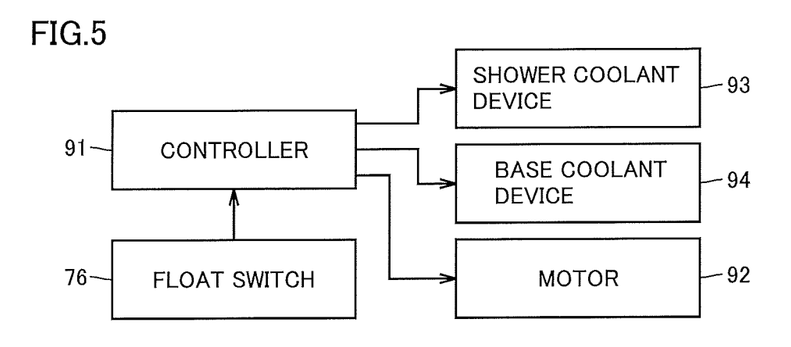
FIG. 5 is a block diagram showing the configuration of an overflow prevention mechanism provided in the machine tool in FIG. 1.

Chip conveyor 10 further includes a chip conveyance unit 35 and a motor 92 (see FIG. 5). Chip conveyance unit 35 is housed in cover body 21. Chip conveyance unit 35 serves as a device for conveying the chips inside cover body 21. Motor 92 serves as a driving source for driving chip conveyance unit 35.

More specifically, chip conveyance unit 35 includes a pair of endless chains 34, a driving sprocket 37, and a driven sprocket 38.

Driving sprocket 37 is provided at the distal end of standing portion 26 extending obliquely upward from horizontal portion 22. Driving sprocket 37 is arranged above chip discharging unit 27. Driving sprocket 37 is supported so as to be rotatable about the axis extending in the direction orthogonal to the surface of the sheet of paper on which FIG. 2 is shown (this direction will be hereinafter also referred to as a "width direction of chip conveyor 10"). The output shaft of motor 92 (not shown in FIGS. 1 and 2) is coupled to driving sprocket 37. Driving sprocket 37 rotates by receiving the motive power from motor 92.

Driven sprocket 38 is provided in the bent portion between horizontal portion 22 and standing portion 26. Driven sprocket 38 is supported so as to be rotatable about the axis (central axis 103) extending in the width direction of chip conveyor 10.

The pair of endless chains 34 are arranged in parallel with each other so as to be spaced apart from each other in the width direction of chip conveyor 10. Each of the paired endless chains 34 is annularly routed inside cover body 21 across horizontal portion 22 and standing portion 26. Endless chain 34 is routed inside cover body 21 so as to reciprocate back and forth between the position corresponding to chip receiving unit 23 and the position corresponding to chip discharging unit 27.

On the path along which endless chain 34 is routed inside cover body 21, endless chain 34 is put around driving sprocket 37 and driven sprocket 38, and guided by a plurality of guide members. When driving sprocket 37 rotates by receiving the motive power from motor 92, endless chain 34 revolves in the direction shown by an arrow 101 (the cross-hatched arrow) in FIG. 2.

The direction in which endless chain 34 moves is reversed by the guide member (not shown) at the other end of horizontal portion 22 (a reverse position 131 shown in FIG. 2). The direction in which endless chain 34 moves is reversed by driving sprocket 37 at the distal end of standing portion 26 (a reverse position 132 shown in FIG. 2) extending obliquely upward from horizontal portion 22.

Reverse position 131 and reverse position 132 are located at both ends of the path along which endless chain 34 is routed. The path along which endless chain 34 (guide plate 31 described later) moves from reverse position 131 toward reverse position 132 is referred to as a "forward path". The path along which endless chain 34 (guide plate 31 described later) moves from reverse position 132 toward reverse position 131 is referred to as a "return path". Endless chain 34 is routed such that the forward path is located higher than the return path.

Endless chain 34 that moves along the return path is put around driven sprocket 38. In horizontal portion 22, endless chain 34 moving along the forward path and endless chain 34 moving along the return path extend in parallel with each other.

Chip conveyance unit 35 further includes a guide plate (inner pan) 31 and a plurality of scrape plates 36. Chip conveyor 10 is configured as a scraper type including guide plate (inner pan) 31.

Guide plate 31 is provided as a plate member configured to guide the chips inside cover body 21 from the position corresponding to chip receiving unit 23 toward the position corresponding to chip discharging unit 27. Scrape plate 36 is provided as a plate member configured to move in sliding contact with guide plate 31 so as to convey the chips on guide plate 31.

Guide plate 31 is arranged inside endless chain 34 that is routed annularly. Guide plate 31 has an end 32 located at the other end of horizontal portion 22 and an end 33 located at the distal end of standing portion 26 extending obliquely upward from horizontal portion 22. Guide plate 31 extends in a plate shape between end 32 and end 33. Guide plate 31 is fixed onto the inside surface of cover body 21 at both ends of this guide plate 31 in the direction horizontally orthogonal to the direction in which this guide plate 31 extends in a plate shape (the width direction of chip conveyor 10).

Guide plate 31 is arranged in horizontal portion 22 along endless chains 34 moving along the forward path and the return path. Guide plate 31 is arranged in standing portion 26 along endless chain 34 that moves along the forward path. In the bent portion between horizontal portion 22 and standing portion 26, guide plate 31 is arranged between endless chain 34 moving along the forward path and driven sprocket 38, while driven sprocket 38 is arranged between guide plate 31 and endless chain 34 moving along the return path.

In addition, the shape of the guide plate is not limited to the shape as described above, but may be modified as appropriate depending on: the positional relationship between the chip receiving unit and the chip discharging unit; the path along which the scrape plate moves; and the like.

Scrape plate 36 is fixed to endless chain 34. Between a pair of endless chains 34, scrape plate 36 extends in a plate shape in the width direction of chip conveyor 10 while being in contact with guide plate 31. A plurality of scrape plates 36 are arranged so as to be spaced apart from each other in the direction in which endless chain 34 annularly extends.

As endless chain 34 revolves, scrape plate 36 moves in an orbital manner in the direction shown by an arrow 101 in FIG. 2 while being in sliding contact with guide plate 31. While moving along the forward path, scrape plate 36 is in sliding contact with guide plate 31 extending from end 32 to end 33. While moving along the return path, scrape plate 36 is in sliding contact with guide plate 31 in horizontal portion 22.

Scrape plate 36 is provided with a through hole (slit) through which a coolant can flow. The through hole is provided so as to penetrate through scrape plate 36 in the thickness direction.

The chips received through chip receiving unit 23 into cover body 21 are placed on guide plate 31 located directly below chip receiving unit 23. Scrape plate 36 moves along the forward path while being in sliding contact with guide plate 31, so that the chips on guide plate 31 are conveyed. When scrape plate 36 reaches end 33 of guide plate 31, the chips on guide plate 31 are dropped and collected through chip discharging unit 27 in the chip bucket (not shown).

Chip conveyor 10 further includes a coolant discharge mechanism 40. Coolant discharge mechanism 40 is configured to filter the coolant received from machine tool body 120 to thereby discharge a clean coolant from inside cover body 21.

More specifically, coolant discharge mechanism 40 has a drum-shaped filter body 46. Drum-shaped filter body 46 is housed in cover body 21. Drum-shaped filter body 46 is provided in the bent portion between horizontal portion 22 and standing portion 26. Drum-shaped filter body 46 is formed of a filter capable of capturing foreign substances such as chips included in the coolant. Drum-shaped filter body 46 has a cylindrical shape and has an internal space 47 formed therein.

Cover body 21 is provided with a coolant discharge portion 28. Coolant discharge portion 28 is formed of a through hole penetrating through cover body 21. Coolant discharge portion 28 is provided so as to allow communication between internal space 47 of drum-shaped filter body 46 and the external space outside cover body 21.

The coolant received through chip receiving unit 23 into cover body 21 flows through the through hole provided in scrape plate 36 and moves toward the space between guide plate 31 and the bottom plate of cover body 21 (the flow shown by an arrow 102 (an outlined arrow) in FIG. 2). The coolant flows into internal space 47 of drum-shaped filter body 46, so that the coolant is filtered. The filtered coolant is discharged through coolant discharge portion 28 into coolant tank 50.

Drum-shaped filter body 46 is arranged such that its central axis extends in the width direction of chip conveyor 10. Drum-shaped filter body 46 is arranged such that its central axis coincides with central axis 103 defined as the rotation center of driven sprocket 38. Drum-shaped filter body 46 is connected to driven sprocket 38 at both ends of this drum-shaped filter body 46 in the axis direction of central axis 103.

The motive power from motor 92 is transmitted through chip conveyance unit 35 to drum-shaped filter body 46, thereby causing drum-shaped filter body 46 to rotate about central axis 103. More specifically, the motive power from motor 92 is transmitted through driving sprocket 37, endless chain 34 and driven sprocket 38 to drum-shaped filter body 46, thereby causing drum-shaped filter body 46 to rotate about central axis 103.

Coolant discharge mechanism 40 further includes a coolant injection unit 48. Coolant injection unit 48 is arranged in internal space 47 of drum-shaped filter body 46. Coolant injection unit 48 is configured so as to be capable of injecting the coolant toward drum-shaped filter body 46. Coolant injection unit 48 is formed of a nozzle and arranged such that its discharge port is directed radially outward of central axis 103. The coolant is injected from coolant injection unit 48 toward drum-shaped filter body 46 that rotates about central axis 103, so that the filter constituting drum-shaped filter body 46 is cleaned as required.

Then, the mechanism for preventing occurrence of an overflow of the coolant in chip conveyor 10 (overflow prevention mechanism) will be described below.

Figure 3:
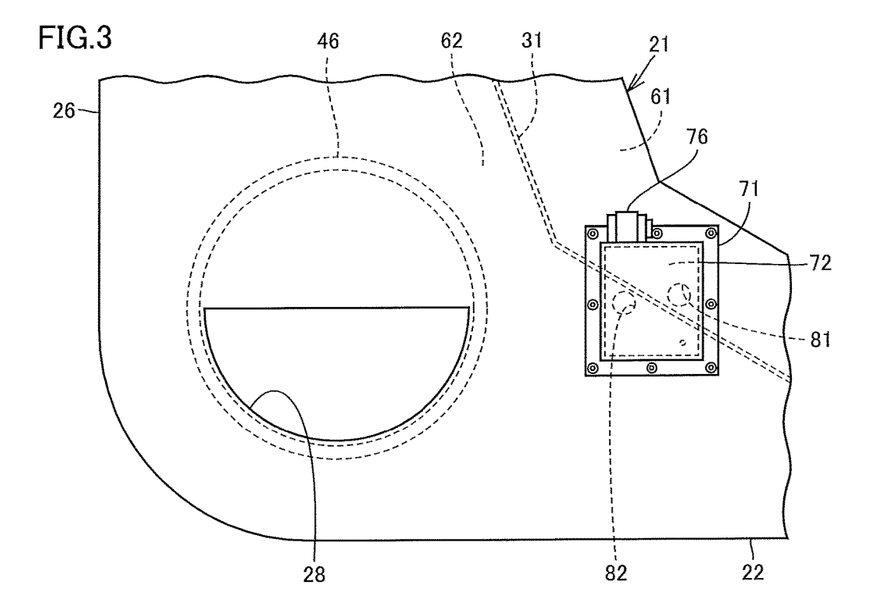
FIG. 3 is a side view showing a part (a bent portion) of the chip conveyor in FIG. 2.
Figure 4:
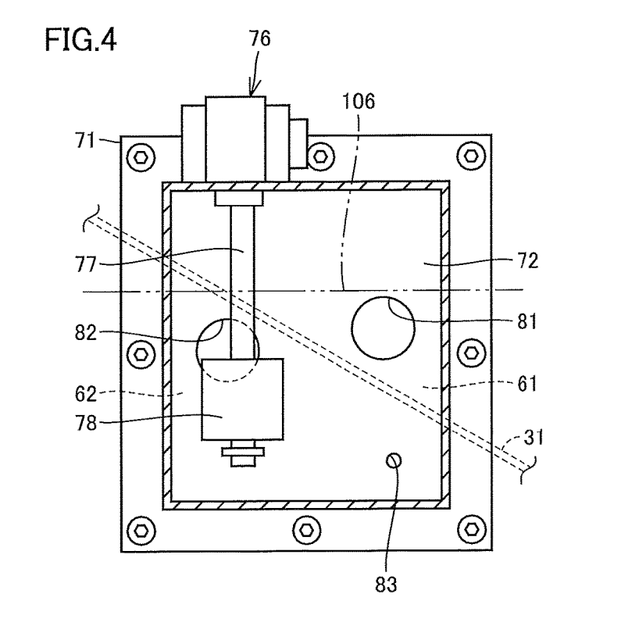
FIG. 4 is a side view showing the inside of a case attached to the chip conveyor in FIG. 3.

FIG. 3 is a side view showing a part (a bent portion) of the chip conveyor in FIG. 2. FIG. 4 is a side view showing the inside of a case attached to the chip conveyor in FIG. 3.

Referring to FIGS. 2 to 4, a first space 61 and a second space 62 that are partitioned by guide plate 31 are provided inside cover body 21. First space 61 and second space 62 are formed from the bent portion between horizontal portion 22 and standing portion 26 so as to extend across standing portion 26. First space 61 is located above second space 62 with guide plate 31 interposed therebetween. Chip receiving unit 23 is provided on the same side as first space 61 with respect to guide plate 31. Chip discharging unit 27 is provided on the same side as second space 62 with respect to guide plate 31. Drum-shaped filter body 46 is provided in second space 62.

Chip conveyor 10 further includes a case 71. Case 71 is attached to cover body 21.

Case 71 is formed in a housing shape having an opening that is opened in one direction, and attached to cover body 21 such that the opening is closed by cover body 21. Case 71 is attached to cover body 21, thereby forming an internal space 72 inside case 71.

Case 71 is attached to the side surface of cover body 21, which faces in the width direction of chip conveyor 10. Case 71 is attached to the bent portion between horizontal portion 22 and standing portion 26 in cover body 21. Case 71 is attached to the position adjacent to coolant discharge portion 28. When chip conveyor 10 is seen laterally in its width direction, case 71 is provided at the position where it overlaps with guide plate 31.

Cover body 21 is provided with a first opening 81 and a second opening 82. First opening 81 and second opening 82 each are formed of a through hole penetrating through (the side surface of) cover body 21. First opening 81 is provided so as to allow communication between first space 61 inside cover body 21 and internal space 72 inside case 71. Second opening 82 is provided so as to allow communication between second space 62 inside cover body 21 and internal space 72 inside case 71.

As will be described later, it is assumed in the present embodiment that the liquid level of the coolant in first space 61 is higher than the liquid level of the coolant in second space 62. In this case, it is preferable that first opening 81 is provided at a position higher than second opening 82. First opening 81 and second opening 82 are provided so as to partially overlap with each other in the height direction.

In addition, first opening 81 and second opening 82 may be provided so as not to partially overlap with each other in the height direction. First opening 81 and second opening 82 may be provided at the same height.

FIGS. 2 and 4 each show a coolant liquid level (liquid level abnormal level) 106 that is detected by a float switch 76 (described later) in order to prevent an overflow of the coolant. Liquid level abnormal level 106 is set at the height immediately before the liquid level of the coolant inside cover body 21 reaches the height at which the coolant overflows (the height of the lower end of connection port 24 shown in FIG. 2 in the present embodiment).

First opening 81 and second opening 82 each are provided at the position lower than liquid level abnormal level 106. First opening 81 and second opening 82 each may be provided at the position where each of these openings overlaps with liquid level abnormal level 106, or only first opening 81 may be provided at the position where it overlaps with liquid level abnormal level 106.

Cover body 21 is further provided with a third opening 83. Third opening 83 is formed of a through hole penetrating through (the side surface of) cover body 21. Third opening 83 is provided so as to allow communication between second space 62 inside cover body 21 and internal space 72 inside case 71. Third opening 83 may be provided so as to allow communication between first space 61 inside cover body 21 and internal space 72 inside case 71.

Third opening 83 is smaller in opening area than first opening 81. Third opening 83 is smaller in opening area than second opening 82. Third opening 83 is provided at the position lower than first opening 81 and second opening 82. Third opening 83 is provided so as not to partially overlap with first opening 81 and second opening 82 in the height direction.

In addition, FIG. 4 shows first opening 81, second opening 82 and third opening 83, each of which has a circular opening shape, but the opening shapes of first opening 81, second opening 82 and third opening 83 are not particularly limited.

Chip conveyor 10 further includes a mesh member 74 (not shown in FIG. 4, see FIGS. 7 to 10 described later). Mesh member 74 is provided so as to close first opening 81 and second opening 82. Mesh member 74 has a plane shape that is interposed between the opening of case 71 and cover body 21. By such a configuration, extremely small foreign substances inside cover body 21 can be prevented from being introduced into internal space 72 through first opening 81 and second opening 82.

Chip conveyor 10 further includes a float switch 76. Float switch 76 is attached to case 71. Float switch 76 is provided as a liquid level detection unit configured to detect, based on the coolant having flown into internal space 72 from inside cover body 21, that the liquid level of the coolant inside cover body 21 is equal to or greater than a prescribed liquid level (equal to or greater than liquid level abnormal level 106).

More specifically, float switch 76 includes a shaft portion 77 and a float portion 78. Shaft portion 77 and float portion 78 are arranged in internal space 72. Shaft portion 77 extends in a shaft shape along the vertical direction. Float portion 78 is fitted into shaft portion 77 so as to be movable in the axis direction of shaft portion 77. By upward and downward movement of float portion 78 according to the liquid level of the coolant having flown into internal space 72, float switch 76 detects that the liquid level of the coolant inside cover body 21 is equal to or greater than the prescribed liquid level.

In place of float switch 76, a capacitance-type water level sensor may be provided. Float switch 76 is used to thereby achieve an effect that a high tolerance can be ensured against foreign substances such as chips having entered internal space 72.

Figure 6:
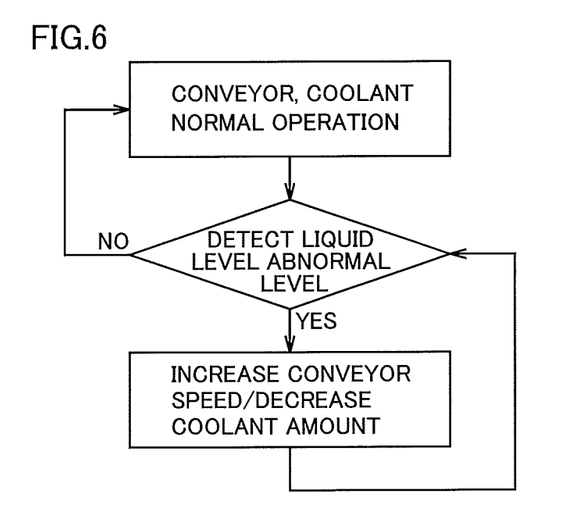
FIG. 6 is a flowchart showing a control flow for a motor, a shower coolant device and a base coolant device by the overflow prevention mechanism in FIG. 5.

FIG. 5 is a block diagram showing the configuration of an overflow prevention mechanism provided in the machine tool in FIG. 1. FIG. 6 is a flowchart showing a control flow for a motor, a shower coolant device and a base coolant device by the overflow prevention mechanism in FIG. 5.

Referring to FIGS. 5 and 6, machine tool 110 further includes a shower coolant device 93 and a base coolant device 94.

Shower coolant device 93 is configured to inject a coolant from the ceiling side of the machining area in machine tool body 120 into the machining area. As a typical example, shower coolant device 93 is formed of: a pump for shower coolant provided as one of a plurality of pumps 57 in FIG. 1; a plurality of nozzles attached to the vicinity of the ceiling of the machining area; a pipe for connection between the pump for shower coolant and the plurality of nozzles; and a solenoid valve provided on the path of the pipe.

Base coolant device 94 is configured to inject a coolant toward the floor side of the machining area in machine tool body 120. As a typical example, base coolant device 94 is formed of: a pump for base coolant provided as one of the plurality of pumps 57 in FIG. 1; a plurality of nozzles attached to the vicinity of the floor of the machining area; a pipe for connection between the pump for base coolant and the plurality of nozzles; and a solenoid valve provided on the path of the pipe.

Machine tool body 120 includes a controller 91. Controller 91 is provided in machine tool body 120 and serves as a control panel for controlling various operations of machine tool body 120. Based on the detection result of the coolant liquid level by float switch 76, controller 91 controls motor 92 to drive chip conveyance unit 35. Based on the detection result of the coolant liquid level by float switch 76, controller 91 controls the injection amount of the coolant from shower coolant device 93 and base coolant device 94 into the machining area (more specifically, the discharge amount from the pump that constitutes shower coolant device 93 and base coolant device 94).

Figure 7:
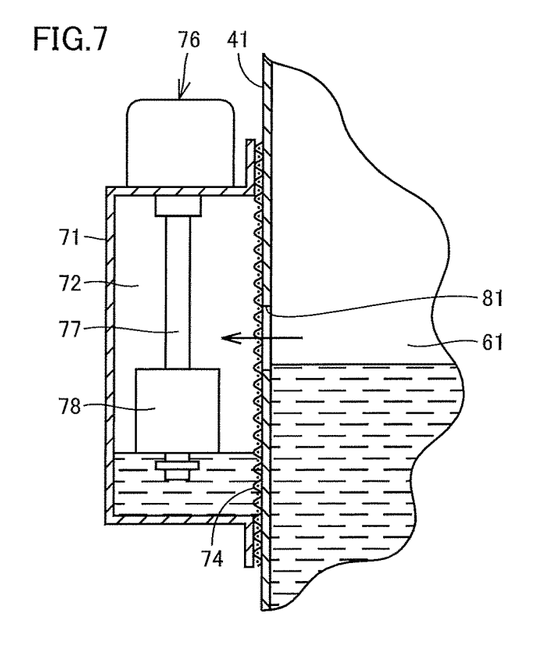
FIG. 7 is a cross-sectional view showing a change in a liquid level of the coolant inside the cover body and the case in FIG. 4.
Figure 8:
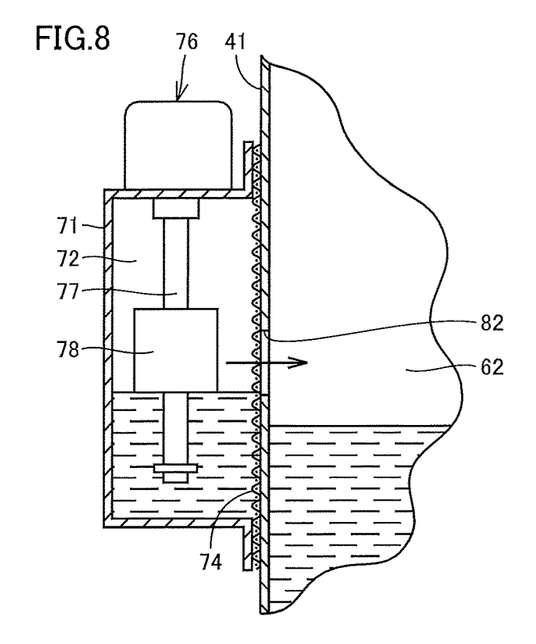
FIG. 8 is a cross-sectional view showing a change in the liquid level of the coolant inside the cover body and the case in FIG. 4.
Figure 9:
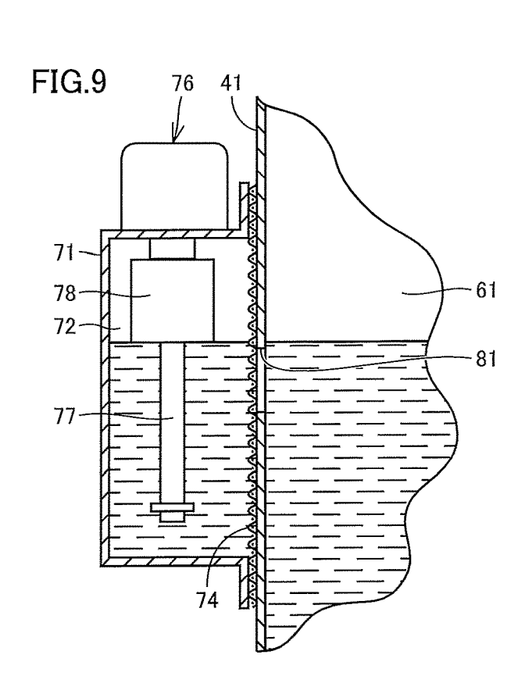
FIG. 9 is a cross-sectional view showing a change in the liquid level of the coolant inside the cover body and the case in FIG. 4.
Figure 10:
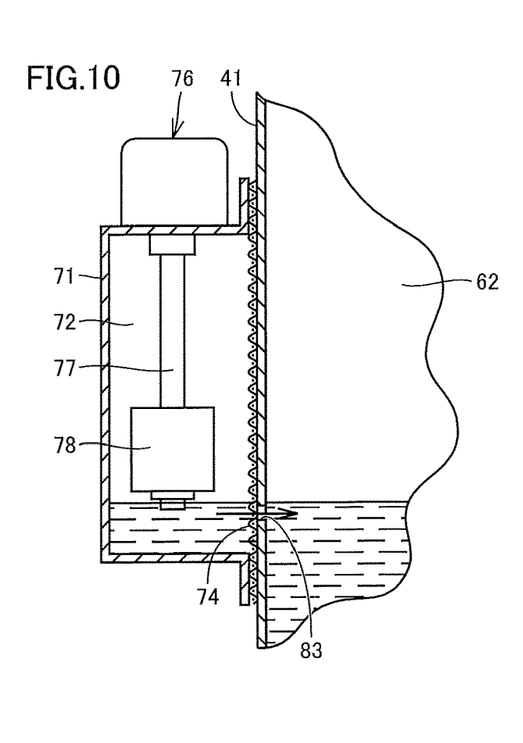
FIG. 10 is a cross-sectional view showing a change in the liquid level of the coolant inside the cover body and the case in FIG. 4.

FIGS. 7 to 10 each are a cross-sectional view showing a change in the liquid level of the coolant inside the cover body and the case in FIG. 4. For convenience of explanation, FIGS. 7 and 9 each show a cross section including first space 61 and first opening 81; FIG. 8 shows a cross section including second space 62 and second opening 82; and FIG. 10 shows a cross section including second space 62 and third opening 83.

Referring to FIGS. 2 to 4 and FIG. 7, when the filter is clogged in drum-shaped filter body 46, the coolant is prevented from flowing from inside cover body 21 into internal space 47 in drum-shaped filter body 46. Then, the liquid level of the coolant inside cover body 21 rises.

In this case, since the internal space of cover body 21 is partitioned by guide plate 31 into first space 61 and second space 62, there occurs a difference between the liquid level in first space 61 and the liquid level in second space 62. In the present embodiment, it is assumed that the liquid level in first space 61 receiving the coolant from machine tool body 120 becomes higher than the liquid level in second space 62. When the liquid level of the coolant in first space 61 reaches first opening 81, the coolant in first space 61 flows through first opening 81 into internal space 72.

Referring to FIGS. 2 to 4 and FIG. 8, the coolant in first space 61 flows into internal space 72, so that the liquid level of the coolant in internal space 72 rises. When the liquid level of the coolant in internal space 72 reaches second opening 82, the coolant in first space 61 flows into second space 62 through internal space 72. Thereby, the liquid level of the coolant in first space 61 and the liquid level of the coolant in second space 62 can be aligned with each other.

Referring to FIGS. 2 to 4 and FIG. 9, the liquid level of the coolant in internal space 72 also rises according to the rise of the liquid level of the coolant in each of first space 61 and second space 62. When float portion 78 reaches a predetermined certain height, float switch 76 detects that the liquid level of the coolant inside cover body 21 is equal to or greater than a prescribed liquid level (equal to or greater than liquid level abnormal level 106).

Referring to FIGS. 5 and 6, when float switch 76 does not detect that the liquid level of the coolant inside cover body 21 is equal to or greater than liquid level abnormal level 106, controller 91 performs normal operations for: chip conveyance unit 35 in chip conveyor 10; and the coolant injection in shower coolant device 93 and base coolant device 94.

On the other hand, when float switch 76 detects that the liquid level of the coolant inside cover body 21 is equal to or greater than liquid level abnormal level 106, controller 91 controls the injection amount of the coolant in each of shower coolant device 93 and base coolant device 94 so as to decrease the amount of coolant injected into the machining area. By way of example, the injection amount of the coolant in each of shower coolant device 93 and base coolant device 94 is controlled to be two-thirds of the injection amount of the coolant during the normal operation.

Thereby, since the amount of coolant flowing from machine tool body 120 and received into cover body 21 is decreased, the liquid level of the coolant inside cover body 21 can be lowered. The intended use of the shower coolant and the base coolant is mainly to remove the chips adhering to the wall surface inside the machining area. Accordingly, the decreased coolant amount does not influence the machining accuracy for the workpiece. Furthermore, the flow rates of the shower coolant and the base coolant are higher than those of the spindle coolant, the through spindle coolant, and the like. Thus, the injection amount of the coolant in each of shower coolant device 93 and base coolant device 94 is controlled, which more effectively acts to lower the liquid level of the coolant inside cover body 21.

In addition, only one of the injection amount of the coolant in shower coolant device 93 and the injection amount of the coolant in base coolant device 94 may be controlled.

Furthermore, when float switch 76 detects that the liquid level of the coolant inside cover body 21 is equal to or greater than liquid level abnormal level 106, controller 91 controls motor 92 to drive chip conveyance unit 35 so as to increase the speed of conveying the chips in chip conveyance unit 35.

Thereby, the rotation speed of drum-shaped filter body 46 is increased as the speed of conveying the chips is increased. Thus, the efficiency of cleaning drum-shaped filter body 46 by coolant injection unit 48 is improved. Consequently, since clogging of drum-shaped filter body 46 is eliminated, the liquid level of the coolant inside cover body 21 can be lowered.

In addition, only one of (i) the injection amount of the coolant in each of shower coolant device 93 and base coolant device 94 and (ii) driving of chip conveyance unit 35 may be controlled.

Referring to FIGS. 2 to 4 and FIG. 10, when the liquid level of the coolant inside cover body 21 lowers, the liquid level of the coolant in internal space 72 also lowers, so that detection of liquid level abnormal level 106 by float switch 76 is accordingly canceled. When the liquid level of the coolant inside cover body 21 further lowers, the coolant in internal space 72 is discharged through third opening 83 into cover body 21.

The following is a summarized explanation about the structure of chip conveyor 10 in the first embodiment of the present invention as described above. Chip conveyor 10 in the present embodiment includes: cover body 21 configured to receive chips and a coolant; guide plate 31 configured to guide the chips, which are conveyed inside cover body 21, so as to be directed from the chip receiving position toward the chip discharging position; case 71 as a housing attached to cover body 21 and having an internal space 72 provided therein; and float switch 76 as a liquid level detection unit configured to detect, based on the coolant flowing from inside cover body 21 into internal space 72, that a liquid level of the coolant inside cover body 21 is equal to or greater than a prescribed liquid level. Cover body 21 includes first space 61 and second space 62 that are partitioned from each other by guide plate 31. Cover body 21 is provided with: first opening 81 allowing communication between first space 61 and internal space 72; and second opening 82 allowing communication between second space 62 and internal space 72.

When cover body 21 is provided with only one of first opening 81 and second opening 82, float switch 76 may detect a lower liquid level from among the liquid level of the coolant in first space 61 and the liquid level of the coolant in second space 62. In this case, there is a possibility that the higher liquid level may reach the lower end of connection port 24 before float switch 76 detects liquid level abnormal level 106, thereby causing an overflow of the coolant.

In contrast, in the present embodiment, cover body 21 is provided with first opening 81 and second opening 82, thereby appropriately detecting the liquid level of the coolant inside cover body 21, with the result that an overflow of the coolant can be more reliably prevented.

Second Embodiment

Figure 11:
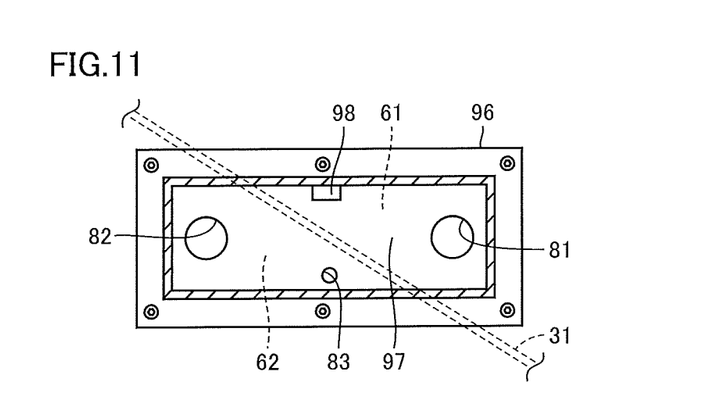
FIG. 11 is a cross-sectional view showing a chip conveyor in the second embodiment of the present invention.

FIG. 11 is a cross-sectional view showing a chip conveyor in the second embodiment of the present invention. FIG. 11 is a diagram corresponding to FIG. 4 in the first embodiment. The chip conveyor in the present embodiment has a structure that is basically similar to that of chip conveyor 10 in the first embodiment. The description of the identical structure will not be hereinafter repeated.

Referring to FIG. 11, the chip conveyor in the present embodiment includes a case 96 in place of case 71 in the first embodiment, and a flow switch 98 in place of float switch 76 in the first embodiment.

Case 96 includes an internal space 97 that extends in a tubular shape between the opening position of first opening 81 and the opening position of second opening 82. Flow switch 98 serves as a switch capable of detecting the flow of the coolant in internal space 97. Flow switch 98 is provided at the position lower than the height at which the coolant inside cover body 21 overflows (the height of the lower end of connection port 24 shown in FIG. 2).

Flow switch 98 detects the flow of the coolant moving from inside cover body 21 through first opening 81 and second opening 82 into internal space 97, thereby detecting that the liquid level of the coolant inside cover body 21 is equal to or greater than a prescribed liquid level.

According to the chip conveyor in the second embodiment of the present invention configured as described above, the effect described in the first embodiment can be similarly achieved.

The following is a summarized explanation about the configuration of the present invention, and the functions and effects achieved by the present invention.

A chip conveyor according to the present invention includes: a cover body configured to receive chips and a coolant; a guide plate configured to guide the chips, which are conveyed inside the cover body, so as to be directed from a chip receiving position toward a chip discharging position; a housing attached to the cover body and having an internal space provided therein; and a liquid level detection unit configured to detect, based on the coolant flowing from inside the cover body into the internal space, that a liquid level of the coolant inside the cover body is equal to or greater than a prescribed liquid level. The cover body includes a first space and a second space that are partitioned from each other by the guide plate. The cover body is provided with: a first opening allowing communication between the first space and the internal space; and a second opening allowing communication between the second space and the internal space.

According to the chip conveyor configured as described above, even if the coolant liquid levels are different between the first space and the second space, the coolant flows from the space where the liquid level is relatively high through the first opening, the internal space and the second opening toward the space where the liquid level is relatively low. Thereby, the liquid level in the first space and the liquid level in the second space can be aligned with each other. Accordingly, the liquid level detection unit can appropriately detect the liquid level of the coolant inside the cover body, so that an overflow of the coolant can be more reliably prevented.

Also preferably, the cover body is further provided with a third opening allowing communication from inside the cover body into the internal space. The third opening is smaller in opening area than each of the first opening and the second opening, and is provided at a position lower than the first opening and the second opening.

According to the chip conveyor configured in this way, when the liquid level of the coolant inside the cover body lowers, the coolant can be returned from the internal space through the third opening into the cover body.

Further preferably, a mesh member is provided so as to close the first opening and the second opening. According to the chip conveyor configured in this way, foreign substances such as chips can be prevented from being introduced from inside the cover body through the first opening and the second opening into the internal space.

A machine tool according to the present invention includes: a machine tool body configured to machine a workpiece; and the chip conveyor described in any of the above and configured to receive chips and a coolant that are discharged from the machine tool body.

According to the machine tool configured in this way, an overflow of the coolant in the chip conveyor can be more reliably prevented.

Further preferably, the chip conveyor includes: a chip conveyance unit housed in the cover body and configured to convey chips; a motor configured to drive the chip conveyance unit; and a coolant discharge mechanism including a drum-shaped filter body configured to filter the coolant and a coolant injection unit configured to inject the coolant toward the drum-shaped filter body to clean the drum-shaped filter body, the coolant discharge mechanism being configured to discharge the coolant filtered by the drum-shaped filter body from inside the cover body. The drum-shaped filter body is configured to rotate by receiving motive power from the motor through the chip conveyance unit. The machine tool body includes a controller configured to control the motor to drive the chip conveyance unit so as to increase a speed of conveying the chips in the chip conveyance unit when the liquid level detection unit detects that a liquid level of the coolant inside the cover body is equal to or greater than a prescribed liquid level.

According to the machine tool configured in this way, when the liquid level detection unit detects that the liquid level of the coolant inside the cover body is equal to or greater than the prescribed liquid level, the speed of conveying the chips in the chip conveyance unit is increased, thereby increasing the rotation speed of the drum-shaped filter body. Thereby, the efficiency of cleaning the drum-shaped filter body by the coolant injection unit is improved, so that clogging of the drum-shaped filter body can be eliminated. Consequently, the liquid level of the coolant inside the cover body can be lowered.

Further preferably, the machine tool further includes at least one of: a shower coolant device configured to inject the coolant from a ceiling side of a machining area into the machining area; and a base coolant device configured to inject the coolant toward a floor side of the machining area. The machine tool body includes a controller configured to control an injection amount of the coolant in at least one of the shower coolant device and the base coolant device so as to decrease the injection amount of the coolant into the machining area when the liquid level detection unit detects that a liquid level of the coolant inside the cover body is equal to or greater than a prescribed liquid level.

According to the machine tool configured in this way, when the liquid level detection unit detects that the liquid level of the coolant inside the cover body is equal to or greater than the prescribed liquid level, the injection amount of the coolant into the machining area is decreased, thereby decreasing the amount of the coolant flowing from the machine tool body and received into the cover body. Thereby, the liquid level of the coolant inside the cover body can be lowered.

The present invention is applicable to a chip conveyor configured to receive chips produced by workpiece machining together with a coolant.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A chip conveyor comprising:
a cover body configured to receive chips and a coolant;
a guide plate configured to guide the chips, which are conveyed inside the cover body, so as to be directed from a chip receiving position toward a chip discharging position;
a housing attached to the cover body and having an internal space provided therein; and
a liquid level detection unit configured to detect, based on the coolant flowing from inside the cover body into the internal space, that a liquid level of the coolant inside the cover body is equal to or greater than a prescribed liquid level,
the cover body including a first space and a second space that are partitioned from each other by the guide plate,
the cover body being provided with: a first opening allowing communication between the first space and the internal space; and a second opening allowing communication between the second space and the internal space.

2. The chip conveyor according to claim 1, wherein the cover body is further provided with a third opening allowing communication from inside the cover body into the internal space, and
the third opening is smaller in opening area than each of the first opening and the second opening, and is provided at a position lower than the first opening and the second opening.

3. The chip conveyor according to claim 1, wherein a mesh member is provided so as to close the first opening and the second opening.

4. A machine tool comprising:
a machine tool body configured to machine a workpiece; and
the chip conveyor according to claim 1, the chip conveyor being configured to receive chips and a coolant that are discharged from the machine tool body.

5. The machine tool according to claim 4, wherein the chip conveyor includes:
a chip conveyance unit housed in the cover body and configured to convey chips;
a motor configured to drive the chip conveyance unit; and
a coolant discharge mechanism including
a drum-shaped filter body configured to filter the coolant and
a coolant injection unit configured to inject the coolant toward the drum-shaped filter body to clean the drum-shaped filter body, the coolant discharge mechanism being configured to discharge the coolant filtered by the drum-shaped filter body from inside the cover body,
the drum-shaped filter body is configured to rotate by receiving motive power from the motor through the chip conveyance unit, and
the machine tool body includes
a controller configured to control the motor to drive the chip conveyance unit so as to increase a speed of conveying the chips in the chip conveyance unit when the liquid level detection unit detects that a liquid level of the coolant inside the cover body is equal to or greater than a prescribed liquid level.

6. The machine tool according to claim 4, further comprising at least one of:
a shower coolant device configured to inject the coolant from a ceiling side of a machining area into the machining area; and
a base coolant device configured to inject the coolant toward a floor side of the machining area, wherein
the machine tool body includes
a controller configured to control an injection amount of the coolant in at least one of the shower coolant device and the base coolant device so as to decrease the injection amount of the coolant into the machining area when the liquid level detection unit detects that a liquid level of the coolant inside the cover body is equal to or greater than a prescribed liquid level.

* * * * *